Aug. 31, 1926.
P. R. TALLY
1,598,404
VARIABLE SLICING DEVICE
Filed April 26, 1926
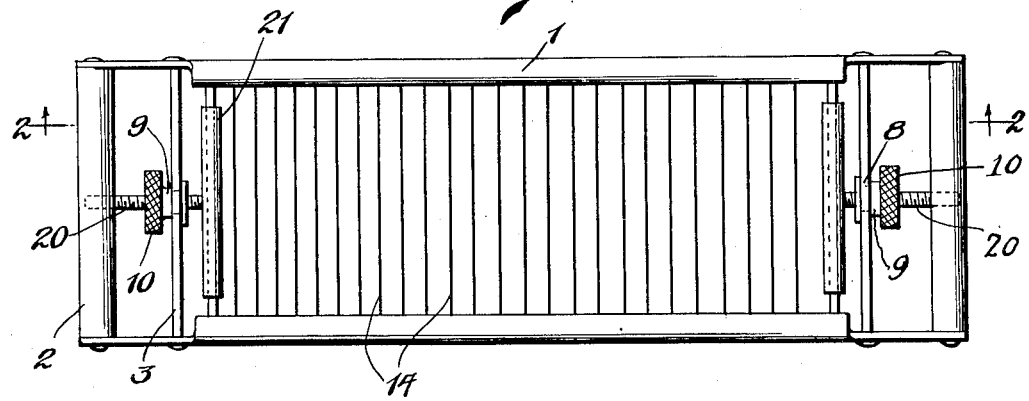
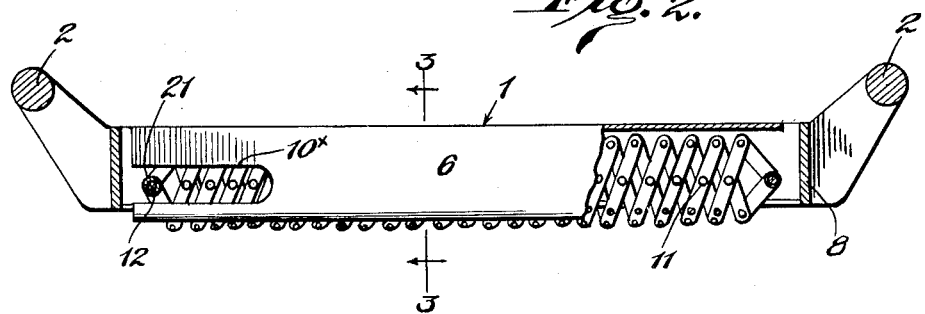
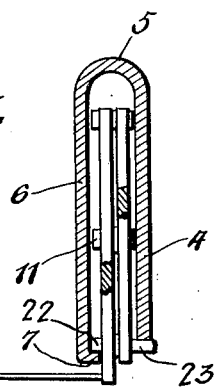
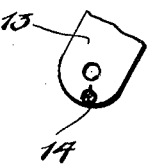
Inventor
*Perry R. Tally*
By *Clarence A. O'Brien*
Attorney

Patented Aug. 31, 1926. 1,598,404

UNITED STATES PATENT OFFICE.

PERRY R. TALLY, OF PRESCOTT, OREGON.

VARIABLE SLICING DEVICE.

Application filed April 26, 1926. Serial No. 104,708.

My present invention has to do with the slicing of butter and other substance, and it contemplates the provision of a peculiar and advantageous device for slicing purposes, characterized by the adaptability to be expeditiously and easily adjusted so as to increase or diminish the distance between the cutting elements so that with the single device slices of different thickness may be produced.

Other objects and practical advantages of the invention will be fully understood from the following description and claims when the same are read in connection with the drawings, accompanying and forming part of this specification, in which:—

Figure 1 is a top plan view of the device constituting the best practical embodiment of my invention that I have as yet devised.
Figure 2 is a longitudinal section of the same, taken in the plane indicated by the line 2—2 of Figure 1 and showing one of the side bars partly broken away.

Figure 3 is an enlarged detail transverse section taken in the plane indicated by the line 3—3 of Figure 2.

Figure 4 is an enlarged fragmentary view showing a portion of one of the lazytongs members of the device.
Similar numerals of reference designate corresponding parts in all of the views of the drawings.

The main frame of my novel device is made up of spaced side bars 1, end bars 2, adapted to serve as handles, and intermediate cross-bars 3. Each of the side bars 1 is preferably formed of metal and shaped in cross-section as shown in Figure 3, and by reference to said Figure 3 it will be noted that each side bar has an outer side wall 4, an upper bend or bight 5 and an inner side wall 6, the said side wall 6 extending to a plane below the lower edge of the side wall 4 and terminating in an outwardly directed flange 7. The intermediate transverse bars 3 are arranged adjacent to though spaced from the handles 2 and are provided with apertures 8 in which are arranged in swivelled manner nuts 9, the said nuts 9 being equipped with knurled circular portions 10 to facilitate turning thereof.

It will also be noted by particular reference to Figure 2 that the inner side wall 6 of each side bar 1 is provided in its ends with slots 10ˣ the purpose of which will presently appear.

Disposed and movable in the side bars 1 are lazytongs 11, the said lazytongs 11 being connected by transverse rods 12, Figures 1 and 2, at the ends of the lazytong members, and certain members 13 of the lazytongs being extended below the lower edges of the side bars 1 and connected to cutting or slicing elements 14, the said elements 14 being arranged transversely of the device and extending between and connecting the two lazytongs together, and being formed, by preference, though not necessarily, of wires.

Mounted on the end bars 12 of the lazytongs are threaded rods 20, the mounting being preferably effected through the medium of barrels 21 disposed directly upon the rods 12 as illustrated. The mentioned threaded rods 20 are extended through and engaged with the nuts 9, and consequently it will be readily understood that turning of the nuts 9 about their axes will be attended by longitudinal expansion or contraction of the lazytongs, and manifestly when the lazytongs are increased in length the spaces intermediate of the cutting elements 14 will be increased, while when said lazytongs are diminished in length, the spaces between the cutting elements 14 will be correspondingly lessened. In this manner the device may be varied for the cutting of slices of butter or other substance of different thicknesses.

By particular reference to Figure 3 it will be noted that certain of the lazytongs members are provided with lateral projections 22 disposed and movable on the flange 7 at the lower edge of one side wall 6 of each side bar. It will also be noted that other lazytongs members are provided with lateral portions 23 disposed against the lower edges of the other side walls 4 of the side bars. Manifestly by virtue of the lazytongs members being connected together and the portions 22 being disposed on the flanges 7, the lazytongs will be adequately supported in the side bars of the device.

It will be apparent from the foregoing that when my novel device is adjusted as desired, and the device is moved downwardly or otherwise through a body of butter or other substance, the cutting elements 14 will cleanly separate the butter or other substance into slices of the desired width; and it will also be noted that the device is susceptible of ready adjustment, and when the device is adjusted there is no liability of the distance between the cutting elements 14 being casually changed.

I have explicitly described the construction constituting the preferred embodiment of my invention in order to impart an exact understanding of the said embodiment in all of its details. I do not desire, however, to be understood as limiting myself to the precise structure disclosed, my invention being defined by my appended claims within the scope of which modifications may be made without departure from my invention.

Having described my invention, what I claim and desire to secure by Letters-Patent, is:—

1. A variable slicing device comprising spaced side bars, end handle portions through the medium of which said side bars are connected together, intermediate cross bars extending between and connecting the side bars at points adjacent to though spaced from the end handles, each of the said side bars having an outer wall, an upper bight, and an inner wall spaced from the outer wall and extending below the plane of the lower edge of the latter and terminating in an outwardly directed flange, lazytongs disposed and movable in said side bars and having portions arranged on said flanges of the side bars and also having portions extending below the plane of the side bars, transverse cutting elements carried by the said downwardly extending portions of the lazytongs and connecting the lazytongs together, end rods joining the end portions of the lazytongs and movable in the side bars, nuts swivelled in the transverse bars between the side bars, and threaded rods connected with the end rods of the lazytongs and extending through and engaged with the said nuts.

2. A variable slicing device comprising spaced side bars, end handle portions through the medium of which said side bars are connected together, intermediate cross bars extending between and connecting the side bars at points adjacent to though spaced from the end handles, each of the said side bars having an outer wall, an upper bight, and an inner wall spaced from the outer wall and extending below the plane of the lower edge of the latter and terminating in an outwardly directed flange, lazytongs disposed and movable in said side bars and having portions arranged on said flanges of the side bars and also having portions extending below the plane of the side bars, transverse cutting elements carried by the said downwardly extending portions of the lazytongs and connecting the lazytongs together, end rods joining the end portions of the lazytongs and movable in the side bars, nuts swivelled in the transverse bars between the side bars, and threaded rods connected with the end rods of the lazytongs and extending through and engaged with the said nuts; the said connection of the threaded rods to the end rods of the lazytongs being effected by barrels connected to the inner ends of the threaded rods and mounted on the said end rods of the lazytongs.

3. In a variable slicing device, and in combination, an open frame, spaced lazytongs carried by said frame, means for expanding and contracting said lazytongs, and cutting elements carried by the lazytongs.

4. In a variable slicing device and in combination, an open frame, spaced lazytongs carried by said frame, and cutting or slicing elements carried by the lazytongs.

5. In a variable slicing device and in combination, an open frame having hollow side bars equipped with flanges, lazytongs disposed and movable in said hollow side bars, and supported by and slidable on said flanges, and transverse slicing or cutting elements carried by said lazytongs.

6. In a variable sliding device and in combination, an open frame having hollow side bars equipped with flanges, lazytongs disposed and movable in said hollow side bars and supported by said flanges, and tranverse slicing or cutting elements carried by said lazytongs; the said lazytongs being provided with connecting end rods, and threaded rods being connected with said end rods and extending longitudinally outward therefrom, and nuts mounted in the frame to rotate and be held against endwise movement, said nuts receiving and engaging said threaded rods.

In testimony whereof I affix my signature.

PERRY R. TALLY.